United States Patent [19]
Humphreys et al.

[11] Patent Number: 5,285,190
[45] Date of Patent: Feb. 8, 1994

[54] AUTOMATIC SLACK ADJUSTER WITH OPERATION AND ADJUSTMENT MONITOR

[75] Inventors: Roger E. Humphreys; Steven B. Humphreys, both of Bonita, Calif.

[73] Assignee: Onboard Systems Limited, Las Vegas, Nev.

[21] Appl. No.: 787,561

[22] Filed: Nov. 4, 1991

[51] Int. Cl.$^5$ .................... B60Q 1/00; F16D 66/00
[52] U.S. Cl. .................................. 340/453; 340/454; 188/1.11; 188/196 R; 116/208
[58] Field of Search ............... 340/453, 454, 525, 461, 340/462; 188/1.11, 196 R; 116/208, 284, 285

[56] References Cited

U.S. PATENT DOCUMENTS

| | | | |
|---|---|---|---|
| 2,554,065 | 5/1951 | Shields | 188/79.5 |
| 3,776,329 | 12/1973 | Hope et al. | 188/1.11 |
| 4,583,071 | 4/1986 | Sebalos et al. | 188/1.11 |
| 4,642,603 | 2/1987 | Martinez, Jr. | 340/453 |
| 4,749,063 | 6/1988 | Garrett et al. | 188/1.11 |
| 4,757,300 | 7/1988 | Sebalos | 188/1.11 |
| 4,800,991 | 1/1989 | Miller | 188/1.11 |
| 4,855,712 | 8/1989 | Wiley, Jr. et al. | 340/453 |
| 4,937,554 | 1/1990 | Herman | 340/453 |

Primary Examiner—Donnie L. Crosland

[57] ABSTRACT

An automatic slack adjuster or manual slack adjuster conversion which automatically adjusts the brakes incorporating a monitoring system that monitors the operation and adjustment of air powered brakes as used on vehicles. The system monitors the travel of the brake components, and when needed uses electromagnetic or pneumatic power to provide adjustment of the vehicle's brakes. Using groups of visual indicators to create a visual dashboard display of all brakes on the vehicle, the driver is provided with immediate and accurate brake operation and adjustment information. The visual indicators are controlled by multi-range position detectors that are incorporated into the automatic slack adjuster or conversion unit. Each position of the multi-range position detector activates an individual visual indicator providing precise range of adjustment indications each time the brakes are applied. If brakes are applied and no indication of brake operation appears on the display unit, the driver is immediately informed that the brake system is malfunctioning. The system is capable of informing and alerting the driver of numerous maintenance and safety problems before they can cause expensive repairs or an accident.

3 Claims, 4 Drawing Sheets

AUTOMATIC SLACK ADJUSTER WITH OPERATION AND ADJUSTMENT MONITOR

CROSS-REFERENCE TO RELATED APPLICATION

This application is related to patent application Ser. No. 07/572,148 filed Aug. 8, 1990 by Roger E. Humphreys and Steven B. Humphreys as equal co-inventors.

BACKGROUND OF THE INVENTION

1. Field of Invention

This invention is a combination of two safety devices for motor vehicles equipped with air powered brakes. Specifically, an automatic brake adjuster to compensate for wear and a visual dashboard display of brake operation and range of adjustment.

2. Description of the Prior Art

The proper operation and adjustment of brakes on motor vehicles is critical to vehicle safety. Brakes must be periodically checked and adjusted on vehicles to compensate for wear. Adjustment is only one of the safety factors addressed with this automatic slack adjuster or automatic adjustment conversion unit. This device includes a method to monitor brake operation and adjustment using a visual dashboard display. The automatic slack adjuster and the automatic slack adjuster conversion unit both adjust the brake and at the same time monitor operation of the brake and automatic slack adjuster. Position detectors incorporated in the automatic slack adjuster and automatic slack adjuster conversion unit monitor movement of brake components and provide position information to visual indicators. Groups of visual indicators corresponding to each brake location on the vehicle create a dashboard display allowing the driver to monitor operation and adjustment of all brakes on his vehicle. A brake that is not operating or out of adjustment can cause a vehicle to swerve into the next lane or into oncoming traffic. If the trailer brakes are not operating or are improperly adjusted they can cause a truck and trailer to jackknife. In a properly operating air brake system, when the driver steps on the brake pedal, air is directed to the air brake chambers, energizing the air chambers to extend their push rods which are connected to slack adjusters.

The slack adjusters then rotate the S cam or disc brake mechanism which, if properly adjusted, forces the brake shoes/pads against the drums/rotors providing the friction necessary to stop the vehicle. A variety of factors such as a disconnected air line, broken air connection, pinched air line, shutoff air valve to the trailer, non-functioning air relay valve, push rod to slack adjuster clevis pin missing, S cam arm broken, self-adjusting slack adjuster failure and excessive air chamber push rod travel can cause the air brakes to have reduced effectiveness, or become non-operational and dangerous without the driver's knowledge.

Federal Department of Transportation regulations require that all drivers of commercial vehicles perform a pretrip vehicle inspection to include the proper operation and adjustment of all brakes on his vehicle. Using this invention, the driver without assistance, is able to check brake operation and adjustment, the releasing of all brakes, the proper connection of all air lines, the opening of all air valves to the trailers, the timing between the truck and trailer brakes, and other critical safety items. By using this system for the pretrip inspection the driver is provided with increased information, some of which could only be determined in a major truck repair facility. The use of the described device will assure that the brakes are operating to the maximum design efficiency. If any malfunction of the brakes during the operation of the vehicle the driver is informed the first time he applies the brakes.

When brakes are operational, but needing adjustment, that adjustment would be performed by this described device. If, for any reason, the adjustment is not performed, the driver is informed by the visual indicators of the dashboard display which brake location needs manual adjustment or repair to continue safe and legal operation. Vehicles not equipped with the automatic slack adjusters with operation and adjustment monitor can have brake component failure which can cause brakes to become illegal and unsafe without any indication to the driver. Use of the automatic slack adjuster with operation and adjustment monitor alerts the driver to the fact that the air chamber push rod travel has exceeded the legal travel length by the audible alarm mounted in the vehicle's cab and a visual indication at the corresponding brake location on the dashboard display. The visual indicators that make up the dashboard display warn the driver that the brakes are remaining engaged after the driver has released the brake pedal. This condition is usually due to a malfunction or lack of maintenance to the brake system. Anytime a brake remains on, it continues to produce friction and heat, which can be a dangerous situation, possibly causing a brake fire which can spread to the tires and ultimately to the vehicle. This automatic slack adjuster or the manual adjuster conversion unit not only adjusts the brake when needed, it allows the driver to continuously monitor the status of each brake on his vehicle, each time the brakes are applied or released.

The visual indicators which make up the dashboard display allows the driver to easily monitor that all brakes on the vehicle are operating in unison when the brake pedal is applied. The automatic slack adjuster or automatic slack adjuster conversion unit uses an electromagnetic or pneumatic motor to provide the power to compensate for wear of the brake shoes. This arrangement reduces the constant movement of the adjustment mechanism, and the requirement for frequent lubrication of these moving parts. Many of the automatic slack adjusters on the market use the angle of air chamber push rod to slack adjuster as the adjustment control. If the automatic slack adjuster is improperly installed, it will not adjust the brakes properly.

Previous patents for brake monitoring systems have informed the driver or maintenance personnel that the brakes need to be adjusted. Not one previous patent has controlled the adjustment of the brakes and monitored brake operation and adjustment at the same time. All previous monitoring system patents have ignored the critical safety problem of non-operational air brakes on vehicles. Some of the previous patents have marginal accuracy in their measurement of the travel of the brake components, others use a process that can initialize the measuring system so as to invalidate the subsequent measurement of brake adjustment. The aforementioned problems of inaccuracy would provide unreliable or false information to the driver.

Relevant Prior Art U.S. Pat. No. 2,554,065 issued to Shields, May 22, 1951, for a Pneumatically Actuated Brake Slack Adjuster requires disassembly of the air chamber to install an air control valve. The device uses an air piston to provide it's power, which requires more maintenance than air diaphragms, the air valve has a vent to release the compressed air after the adjustment operation is completed, which is an unneeded extra part, inasmuch as the brake chamber is vented when the brake application is completed. This device requires the replacement of the manual slack adjuster, instead of converting the existing manual slack adjuster. Shields did not consider the possibility of broken or missing brake components. Brake component failure would actuate the adjustment control valve on every application of the brakes, possibly adjusting the brake shoes until they are in continuous contact with the brake drum. Last but not least this automatic slack adjuster does not have a means to monitor and display to the driver of the vehicle the operation or adjustment of the brake to which it is attached.

Relevant Prior Art U.S. Pat. Nos. 4,855,712 issued to Wiley, Jr. et al, Aug. 8, 1989, 4,800,991 issued to Miller, Jan. 13, 1989, 4,749,063 issued to Garrett et al., Jun. 7, 1988, 4,642,603 issued to Martinez, Jr., Feb. 10, 1987, and 3,776,329 issued to Hope et al., Dec. 4, 1973, and in the preferred embodiment of U.S. Pat. Nos. 4,757,300 issued to Sebalos on Jul. 12, 1988, 4,583,071 issued to Sebalos et al, on Apr. 15, 1986, and 4,937,554 issued to Herman, Jun. 26, 1990 only inform the operator that the brake needs to be adjusted or is out of adjustment to a point that it has reached an unsafe adjustment condition. A second major failing with the listed patents is that none have a method to indicate if brakes are operational. If a brake is non-operational none of these monitoring systems provide an indication that the brake system has failed. Inasmuch as the above listed patents do not monitor the operation of the brakes, a failure in their adjustment monitoring system would not be detected until scheduled maintenance occurred.

A modified form of U.S. Pat. Nos. 4,757,300 issued to Sebalos (1988) and 4,583,071 issued to Sebalos et al, (1986) indicate a method of monitoring movement of the air brake push rod using a rheostat and voltmeter, but this type of system would show different readings as the voltage in the vehicle's electrical system changed. Any of the following conditions would cause this type of system to give inaccurate information as to the brake adjustment: a battery in a low state of charge, a high electrical demand, a short in the electrical system, dirty or corroded battery terminals, dirty or corroded connections between truck and trailer. Furthermore, the physical size of the meters required to display the information for each brake of a multiaxle vehicle would require an excessive amount of dashboard space. The attention required to read a bank of up twelve meters in a moving vehicle would detract from the drivers ability to safely operate the vehicle. U.S. Pat. No. 4,855,712 to Wiley, Jr. et al. (1989) lists an external audible alarm, attached to a vehicle's axle, that would sound to indicate unsafe brake condition being caused by out of adjustment slack adjuster. Problems with audible alarms include: the inability of the operator to hear the alarm, the operator would be required to visually check all of the brakes to find out which one is causing the alarm signal, distracting or confusing other operators unfamiliar with the sounding alarm thinking it is an emergency signal. The patent mentions a backup battery system to preclude the need for power from the vehicle's battery system. A backup battery in case the vehicle's electrical system is not functioning would be useless to a highway vehicle's operation. A highway vehicle that is driven with a non-functioning electrical system is in violation of numerous traffic regulations.

U.S. Pat. Nos. 4,800,991 to Miller (1989), 4,749,063 to Garrett et al. (1988), 4,642,603 to Martinez, Jr. (1987), and in the preferred embodiment of U.S. Pat. Nos. 4,757,300 to Sebalos (1988) and 4,583,071 to Sebalos et al. (1986) requires removal and disassembly of the air chamber, which if not properly performed by trained personnel, can cause serious bodily injury and possible death. This modification to the air chamber requires a significant amount of time, equipment and expense. U.S. Pat. No. 4,749,063 to Garrett et al. (1988) requires extensive modification to the existing brake system which includes multiple air flow measuring devices. Also it requires a cleaner environment than normally associated with trucks and/or heavy equipment. The operation of this system in cold climates requires an absolutely dry air source to prevent moisture from freezing in the system rendering it inoperable.

U.S. Pat. No. 4,800,991 to Miller (1989) is a "plurality of indicators which respond solely to the excess actuator motion when the vehicle brakes are applied to provide a visible indication of such excess motion and the probable need for brake adjustment." Based on Miller's summary, this system provides no intent or means to monitor the operation of the brakes. The patent states that "latching circuitry should be used to keep the indicator on once the limit has been reached." If this circuitry was employed in the device it would then eliminate the device as a means to monitor the retraction of that brake. Once the brake had exceeded it's predetermined distance of actuator travel and the latching circuitry was activated, no further indication of brake movement would be provided to the vehicle operator on that monitored brake. Additionally, Miller states the latching circuitry would guarantee the driver would be able to see the warning light since it would stay on until the driver or maintenance personnel reset the circuitry to shut off the light, precluding the use of an audible alarm. U.S. Pat. No. 4,937,554 issued to Herman (1990) only monitors the need to adjust or illegal/unsafe brake adjustment based on a computer comparison of air pressure versus slack adjuster movement. The monitoring system in this patent does not attempt to adjust the brakes or monitor the operation (application and complete retraction) of the brakes. Although Herman's patent uses a dashboard display the information the driver receives relates only to a need to adjust or unsafe/illegal brake adjustment. Herman mentions the possibility of adding a green light to the dashboard display to indicate the slack adjuster has a movement of less than a determined amount, again versus the amount of air pressure applied to the brakes. The driver of a vehicle equipped with the monitoring system described in Herman's patent would have a false sense of security, even possibly caught in a dangerous situation if the brakes were not operating (engaging) when the driver steps on the pedal. Herman tests for air pressure to the brakes at the manifold, however conditions occurring beyond the manifold are not monitored. Situations preventing the brakes from operating yet not identified to the driver on the dashboard display include: air valves to trailer not turned on when trailer is connected; air hose becoming tangled, pinched, or broken during operation of vehicle; air relay valve not functioning and not directing pressure to trailer brakes. In instances like these, the driver would have no warning of brake failure.

In fact, the computer would display an indication of properly adjusted brakes (a green light) since the CPU is only looking for maximum amount of travel of the slack adjusters for a warning signal, not taking into account that in some cases brakes do not operate when the brake pedal is applied. The lack of operation is not monitored nor is the monitoring of retraction of the brakes after the brake pedal is released, both of the aforementioned conditions are serious and possibly dangerous brake failures. Herman states that when the driver first turns on the ignition the CPU would reset itself, zeroing all slack adjuster measurements to initialize the system. However, when the truck is parked, the spring powered brakes are applied. The spring brakes operate similar to the driver applying the brake, but only on the rear brakes of the tractor and possibly the trailer. If the CPU used this measurement to initialize itself, the monitoring system would be in error inasmuch as the slack adjuster would not be in a retracted (zeroed) position. Herman's system could give the driver an indication of properly adjusted brakes, when in fact, the brakes would not be able to stop the vehicle.

SUMMARY

The automatic slack adjuster with operation and adjustment monitor and the automatic slack adjuster conversion with operation and adjustment monitor described in this patent application will provide the vehicle operator with constantly adjusted brakes and a visual dashboard display that will indicate when brakes are applied:

(1) the brakes are non-operational; or
(2) the brakes are operating, and the automatic slack adjuster is maintaining correct brake adjustment; or
(3) the brakes are operating, but the automatic slack adjuster is not functioning, and needing manual adjustment and/or repair; or
(4) the brakes are operating but illegal and possibly unsafe; and when brakes are released:
(5) the brakes do not retract properly when air pressure is removed from air chamber.
(6) the brakes retract completely when air pressure is removed from air chamber.

This invention automatically adjusts the brakes and informs the vehicle operator as to the operation and adjustment of each brake whenever the brakes are applied or released using an easy to read visual dashboard display indicating the operation of the brake system to include, but to limited to:

a. the range of adjustment of each brake to include, but not limited to, proper operational range to confirm that the automatic slack adjuster is functioning, safe but in need of adjustment range, failure of automatic slack adjuster, or an unsafe condition requiring immediate brake adjustment or repair each time the brakes are applied.

b. the air system is properly connected and all valves are open and trailer brakes are adjusted and operating properly.

c. the air brake hoses between truck and trailer have not become disconnected or broken during the operation of vehicle.

d. all brakes are balanced in their adjustment and are working in unison to assure that leading vehicle brakes are not operating prior to trailing vehicle brakes, which can cause a jackknife or lane change accident in a panic braking situation.

e. the precise length of travel of each air chamber push rod is maintained by the automatic slack adjuster to assure that each brake on the vehicle is providing equal stopping force when applied.

f. all brakes are releasing and not continuing to drag, which increases fuel consumption, brake wear, and overheating the brake reducing stopping power and possibly causing a brake fire.

g. eliminating the need of having two individuals conduct an external visual inspection of brake operation and adjustment.

h. eliminating the requirement for a constant voltage to the rheostat to allow accurate voltmeter readings.

i. eliminating the need for an abnormally clean, dry air source and added operation of the air compressor which increases fuel consumption and a requirement for an additional air dryer system.

j. eliminating the requirement to disassemble major components of the existing braking system for installation, which unless properly done by trained personnel can cause bodily injury or death.

k. the spring powered parking brakes are working properly and have sufficient spring strength.

l. the air powered emergency brakes on trailers are working properly and holding for the required length of time.

m. increasing clutch life by providing information that all brakes are released before attempting to move the vehicle.

n. providing a monitoring system check inasmuch as it monitors the correct operation and adjustment of the brake system.

If the dashboard display does not indicate operation of the brake when the brake pedal is applied, the driver will be immediately alerted that there is a problem with either the monitoring system or the brakes. This eliminates a false sense of security that could occur because of monitoring system failure.

o. the automatic adjuster does not rely on angle of air chamber push rod for adjustment function.

p. the adjuster mechanism is not wearing on the adjustment ratchet unless adjustment of the brake is needed.

q. the manual conversion unit will save resources inasmuch as it will update the existing slack adjuster instead of having to discard it.

Still further objects and advantages will become apparent from a consideration of the ensuing description and drawings.

REFERENCE NUMERALS IN DRAWINGS

Figure 1:
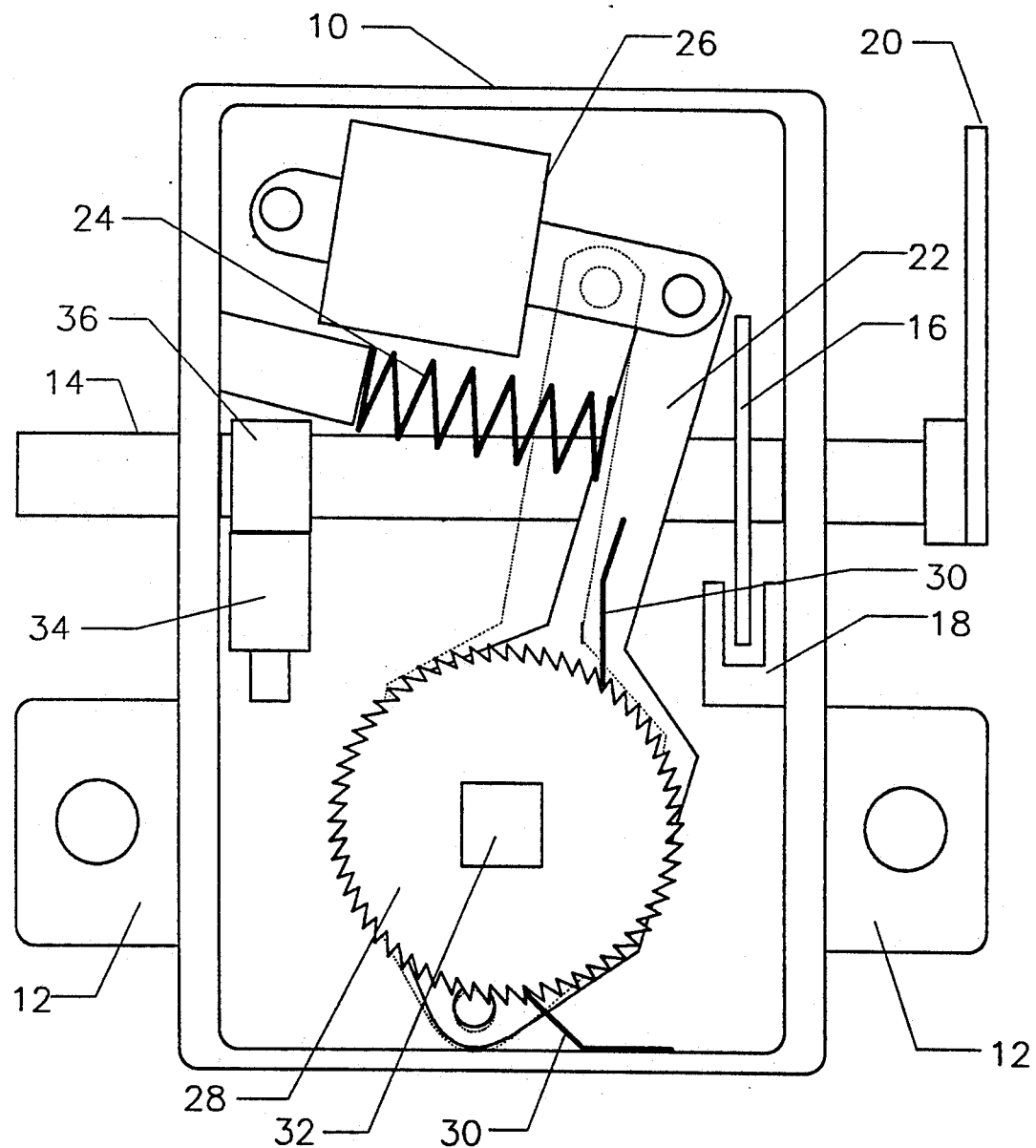
FIG. 1 shows internal parts of slack adjuster conversion with operation and adjustment monitor made up of a multi-range position detector and adjustment mechanism.

10: automatic slack adjuster conversion with operation and adjustment monitor
12: mounting tabs
14: detector control shaft
16: position detector optical interrupter
18: position detector optical switches
20: detector control shaft arm
22: ratchet wheel lever
24: ratchet wheel lever actuating spring
26: slack adjuster motor, electromagnetic or pneumatic
28: ratchet wheel
30: ratchet wheel pawl
32: slack adjuster nut socket and extension
34: slack adjuster motor switch
36: adjuster motor switch cam
38: air chamber push rod
40: control rod
42: mounting clamp
44: brake arm spline
46: manually adjustable slack adjuster
48: clevis pin
50: air chamber push rod clevis
52: mounting clamp bolt
54: air chamber mounting bolt
56: air chamber
58: visual indicator
60: wiring harness
62: visual dashboard display
64: air line
66: integrated circuit encoder
68: integrated circuit decoder
70: wiring harness, decoder to dashboard display
72: control rod bracket
74: audible alarm
76: automatic slack adjuster with operation and adjustment monitor
78: vehicle axle (cross sectional view) with air chamber mounting plate

DESCRIPTION—FIGS. 1 TO 4

FIG. 1 shows an exposed view of automatic slack adjuster conversion with operation and adjustment monitor 10 with cover removed. Mounting tabs 12 on the case to provide an attachment of the device to an existing manually adjusted slack adjuster. The movement of the attached slack adjuster is converted into rotation of detector control shaft 14.

In the preferred embodiment multiple optical switches 18 are arranged in a manner that the rotation of detector control shaft 14 and the attached position detector optical interrupter 16 makes a multi-range position detector which provides a completed circuit to one of the position detector optical switches 18 at a time. Inasmuch as each detector optical switch 18 controls one visual indicator in the dashboard display the display is able to inform the driver as to the operation and range of adjustment of that brake on the vehicle. The number of position detector optical switches 18 and visual indicators can be variable. The rotation of detector control shaft 14 moves adjuster motor switch cam 36, when sufficient rotation occurs slack adjuster motor switch 34 energizes slack adjuster motor 26 to pull ratchet wheel lever 22 compressing ratchet wheel lever actuating spring 24 which causes ratchet wheel pawl 30 attached to ratchet wheel lever 22 to step forward on the ratchet wheel 28. When the brakes are applied ratchet wheel 28 is kept from turning, when the brakes are released the compressed ratchet wheel lever actuating spring 24 can turn the ratchet wheel 28 a step forward on the ratchet wheel pawl 30 attached to the case of the automatic slack adjuster conversion with operation and adjustment monitor 10, the attached slack adjuster nut socket and extension 32 turns the worm gear inside the manually adjusted slack adjuster 46 thereby adjusting the brake.

Figure 2:
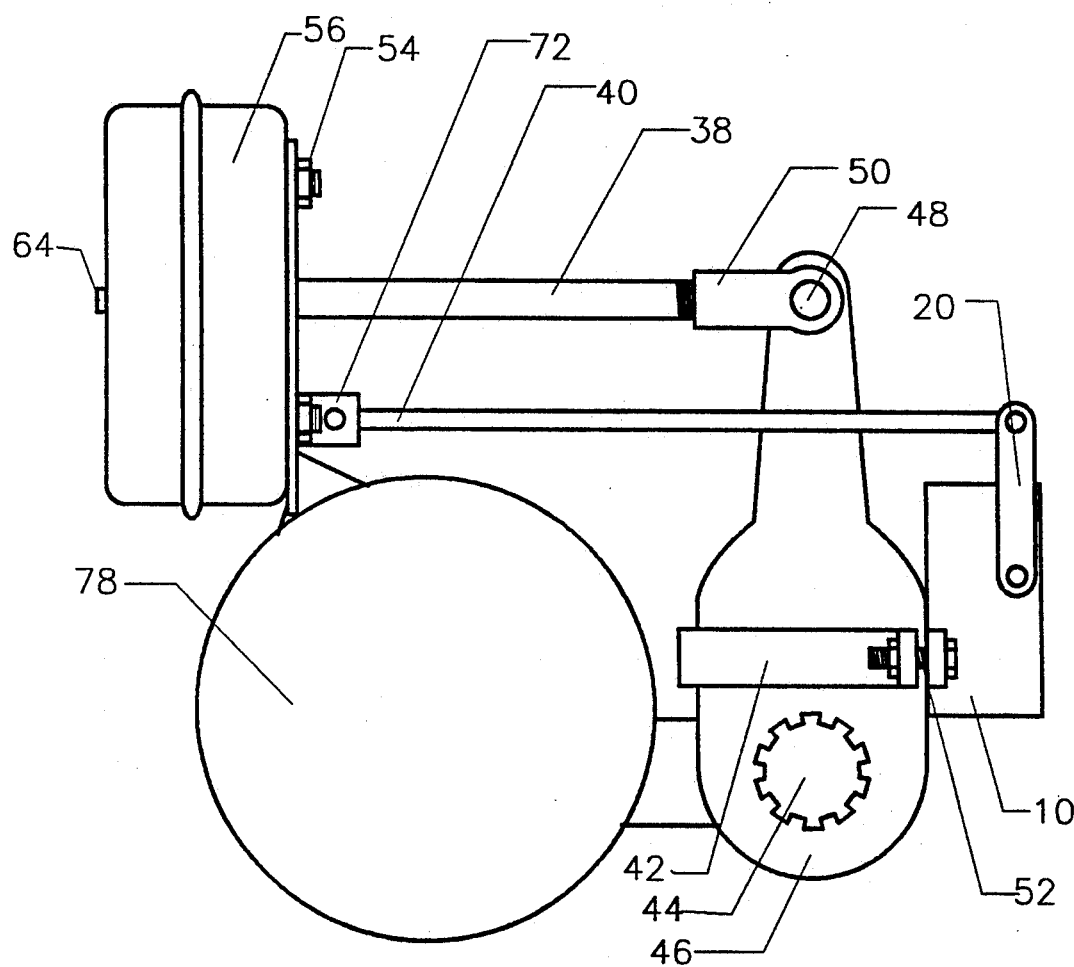
FIG. 2 shows an automatic slack adjuster conversion with operation and adjustment monitor clamped to brake slack adjuster with multi-range position detector arm attached to air chamber.

FIG. 2 shows typical installation of an automatic slack adjuster conversion with operation and adjustment monitor 10 to an existing manually adjustable slack adjuster 46 using mounting clamp 42 and mounting clamp bolts 52. This connection mates the slack adjuster nut socket and extension with the manually adjustable slack adjuster 46 adjusting nut and provides control of the adjustment function. When the driver of the vehicle applies the brakes, compressed air enters air chamber 56 via air line 64 exerting force on the air chamber push rod 38 which is connected by air chamber push rod clevis 50 and clevis pin 48 which is the means to hinge and connect the air chamber push rod 38 and the manually adjustable slack adjuster 46. When brakes are adjusted and air is directed to the air chamber 56 the manually adjustable slack adjuster 46 rotates brake arm spline 44 which engages the brakes to stop the vehicle. Air chamber 56 is attached to vehicle axle with air chamber mounting plate 78 using air chamber mounting bolt 54. Detector control shaft arm 20 is attached to control rod 40 at one end, and the opposite end is attached to control rod bracket 72 using air chamber mounting bolt 54. The subsequent movement of manually adjustable slack adjuster 46 and the attached automatic slack adjuster conversion with operation and adjustment monitor 10 can then be detected to provide operation and adjustment monitoring and control of automatic slack adjuster as described in FIG. 1.

Figure 3:
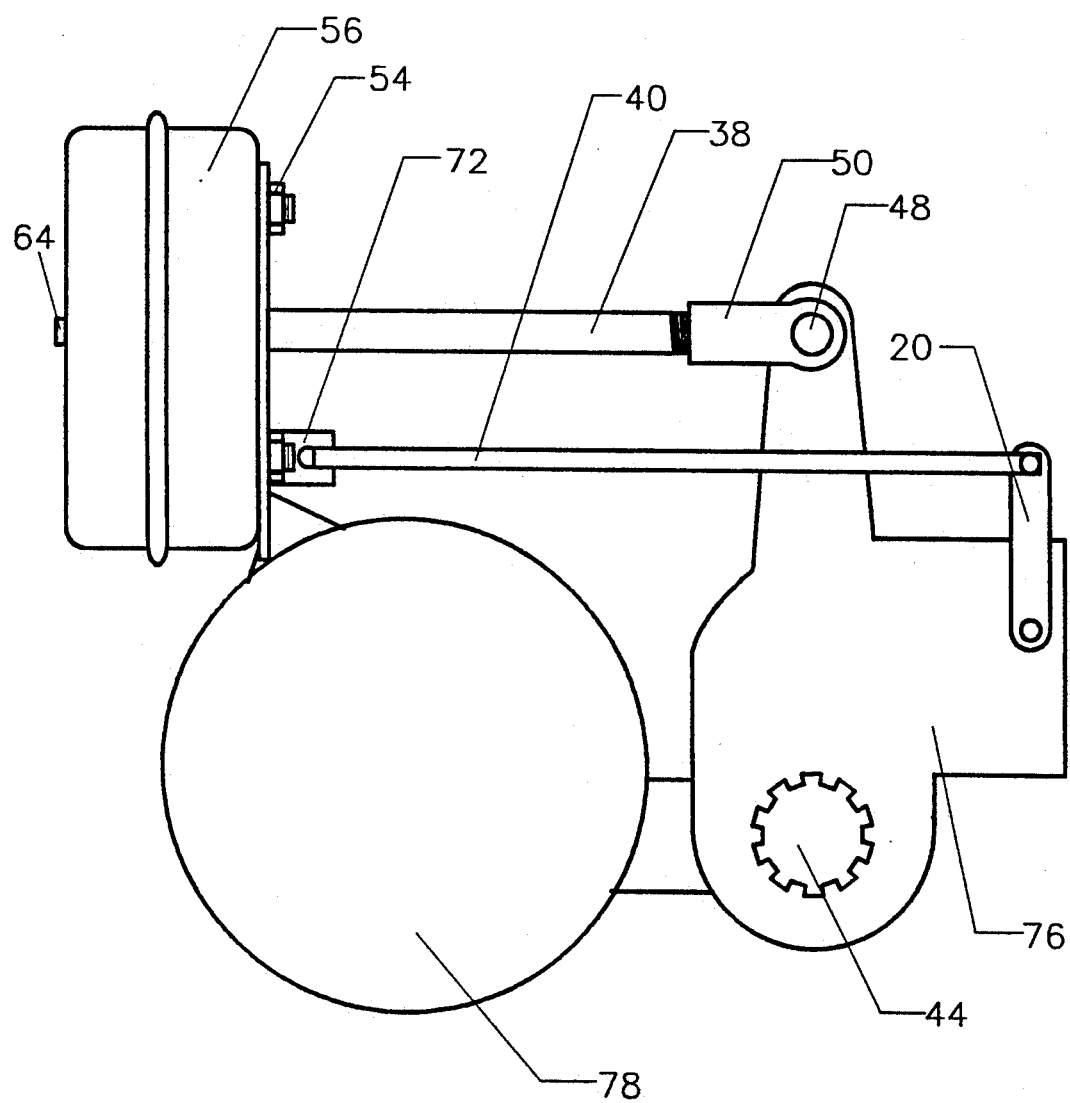
FIG. 3 shows a factory built combination of the automatic slack adjuster with operation and adjustment monitor with multi-range position detector arm attached to air chamber.

FIG. 3 shows a factory built one piece unit automatic slack adjuster with operation and adjustment monitor 76. Combining the manually adjustable slack adjuster and the automatic slack adjuster with operation and adjustment monitor reduces the number of parts required. This embodiment would be preferred by purchasers of new vehicles or as replacements for broken slack adjusters. All other parts and workings of the device are the same as described in FIG. 2.

Figure 4:
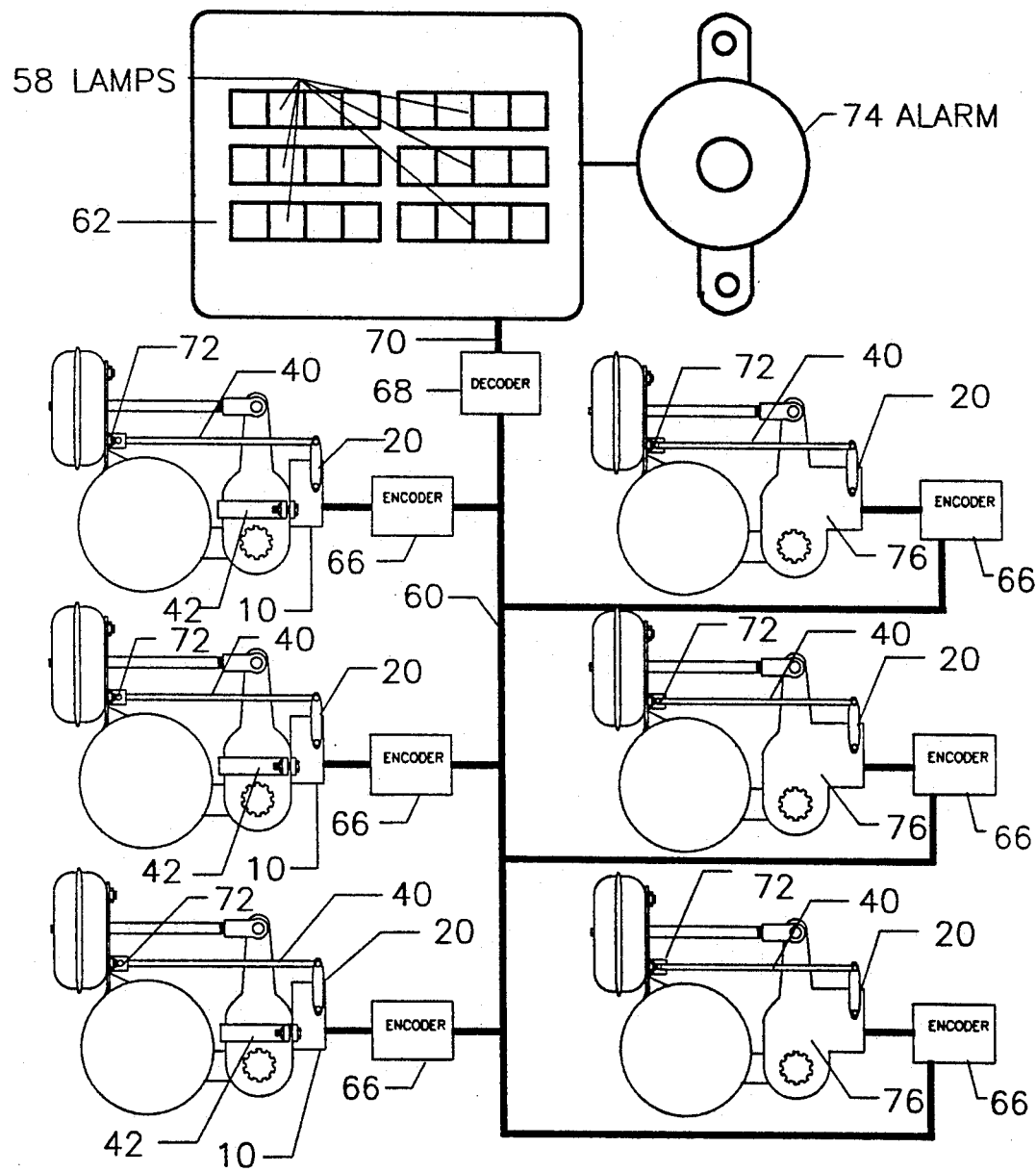
FIG. 4 shows a complete system using both types of automatic slack adjuster with operation and adjustment monitor, three of the conversion units and three of the factory built combinations on a vehicle. The detectors are shown wired to an optional integrated circuit encoder allowing the information to be transmitted using two wires to a decoder that provides the visual indication which corresponds to the appropriate location of the brake on the vehicle and the position of the brake on the visual dashboard display. The system can operate via direct wire connection or use an integrated circuit system that is the standard of the industry for transmitting information with a reduced number of wires.

FIG. 4 shows a combination of three automatic slack adjuster conversion with operation and adjustment monitor 10 and three automatic slack adjuster with operation and adjustment monitor 76. Each of the position detector optical switches 18 controls one visual indicator in the dashboard display. The dashboard display is able to inform the driver as to the operation and range of adjustment of each brake on the vehicle. Using a plurality of automatic slack adjuster conversions or factory built combinations with operation and adjustment monitor, one at each brake position on the vehicle, the driver can receive information on all brakes on his vehicle, using wire harness 60 to integrated circuit encoder 66. Position indicator data is transmitted by wiring harness 60 to the integrated circuit decoder 68. Wiring harness, decoder to visual dashboard display 70 connects the visual indicator 58 and an audible alarm 74.

The number of position detector optical switches 18 and visual indicators 58 is variable. The normal ranges of operation and adjustment could be, but not limited to, five ranges of detection. The first range of brake position would be fully released, and all visual indicators 58 would be off to indicate this range of brake position. When the brakes are released the absence of indication by the visual indicators 58 would confirm that the brakes are operating properly. If a visual indicator 58 remained on when brake are released the driver would be alerted to the fact that the indicated brake position required service or repair. When the brakes are applied lack of corresponding visual indication on the visual dashboard display 62 would inform the driver that the brake is not operating, which is illegal and dangerous. The second position of brake operation would be for an improperly adjusted brake wherein insufficient brake shoe to brake drum clearance exists. This condition would be indicated by, but not limited to, a yellow indicator 58. The third range of detection is a properly adjusted brake using, but not limited to, a green colored visual indicator 58 on the dashboard display 62 to signify that the brake is operating and is correctly adjusted. The fourth range of detection would be for a brake that is improperly adjusted. This brake condition has excessive travel of the air chamber push rod 38 and may soon be illegal and unsafe. This range would be indicated by, but not limited to, an amber visual indicator 58 on the dashboard display.

The fifth range of detection would be for a brake condition that is illegal and unsafe due to excessive travel of the air chamber push rod 38. This range of adjustment would be identified by, but not limited to, a red visual indicator 58 on the visual dashboard display 62 and an audible alarm 74 in the cab of the vehicle to alert the driver to this dangerous condition.

DESCRIPTION OF PREFERRED EMBODIMENT

The preferred embodiments for this automatic slack adjuster with operation and adjustment monitor device can be foreseen in two variations. One embodiment would be for the original equipment manufacturers or as a replacement unit for manual type slack adjusters or other automatic slack adjusters. The second embodiment would be a conversion unit which is attached to existing manual type slack adjusters and provides automatic adjustment control. The conversion unit is an easy and economical method to upgrade existing equipment with latest improvements in safety. Both embodiments would include an operation and adjustment monitor.

This invention provides increased safety for vehicles equipped with air powered brakes. The brake operation and adjustment monitor, as described, provides the operator with a visual display of information every time the brakes are applied or released and adjusts the brakes as needed. The system's visual indicators inform the operator if the brakes are operating and the range of adjustment for each operational brake.

While the above description contains many specificities, these should not be construed as limitations on the scope of the invention, but rather as an exemplification of the preferred embodiments thereof. Many other variations are possible. For example, display options including a full color LED panel similar to the flat television screen could provide additional information such as brake temperature, or other alternate methods could be used to display the information. Other methods of detecting the travel of the air chamber push rod could be built into air chambers at the time of original manufacture. The use of brake position visual indicators in the dashboard display will allow the driver of the vehicle to determine numerous brake problems that can cause dangerous conditions including, but not limited to, brake mechanism rusted or frozen, air line improperly connected, a closed air line valve, a pinched or broken air line, dirt in the relay valve or its filter screen, or an inoperative relay valve. Vehicle operator needs may change the number of ranges of adjustment monitored and displayed by the dashboard display. The design of the automatic slack adjuster may change but the use of the automatic slack adjuster with operation and adjustment monitoring system will improve vehicle safety.

It should further be apparent to those skilled in the art that various changes in form and details of the invention as shown and described may be made. It is intended that such changes be included within the spirit and scope of the claims appended hereto.

We claim:

1. An improved system for automatically adjusting and concurrently monitoring the operation and adjustment of a vehicle's brakes providing a display indication indicative of a position of each brake's push rod as said brake's push rod relates to the operation and adjustment of said vehicle's brakes, said system comprising:

a plurality of segmented switch assemblies, directly attached to said brake push rod, said switch assemblies providing an electrical output signal which corresponds directly to the position of said brake's push rod;

a brake slack adjusting device controlled by a switch attached to one of said segmented switch assemblies for automatically adjusting said brakes in response to said brake push rod movement exceeding a predetermined length of travel;

groups of visual indicators corresponding to the position of said brake push rod as monitored by said segmented switch assemblies to provide a visual display as to the operation and adjustment of said brakes on said vehicle; and an audible alarm warning means located in said vehicle and sounds whenever any of said brake's push rod movement exceeds a predetermined length of travel indicative of dangerous brake condition.

2. On a vehicle equipped with brakes that use compressed air from an air chamber to provide the power for actuation of said brakes, an improvement being an electrical brake operation and adjustment monitoring means connected to said air chamber push rod and generating an output signal; a brake slack adjuster that includes a ratchet wheel, said ratchet wheel includes a slack adjuster nut; said brake slack adjuster further incudes a slack adjuster motor, said motor being operatively connected to said slack adjuster nut for turning said ratchet wheel; said brake slack adjuster further including a slack adjuster motor switch and a detector control shaft, said slack adjuster motor switch actuating said motor in response to a predetermined rotation of said detector control shaft, whereby automatic adjustment of the brakes are achieved;

a visual dashboard display means to remotely display the position of said air chamber push rod as determined by said output signal of said segmented switch assembly and;

an audible alarm warning means connected to said visual dashboard display indicating said air chamber push rod has exceeded a predetermined position.

3. An improvement to a braking system for a motorized vehicle that includes brake drums and brake shoes and uses pressurized air to urge an engaging device to extend which in turn expands the brake shoes therein causing said brake shoes to contact the brake drums creating friction and stopping said motorized vehicle upon actuation of the brake pedal, the improvement is a system for the monitoring of brake operation and adjustment which incorporates a brake adjustment system that can be built into said brake system or added on at a latter time, the system comprises:

a segmented switch directly attached to said engaging device and providing an electrical output signal indicative of the position of the said engaging device, a connecting means to convey said electrical output signal of said segmented switch to display means that indicates the position of said engaging device relative to the operation and adjustment of each brake position on said vehicle, an audible warning means for warning the driver of said vehicle whenever said engaging device exceeds a predetermined travel length, an automatic brake adjustment means for adjusting the brake when said brake engaging device exceeds a predetermined amount of movement.

* * * * *